United States Patent [19]

Motzer

[11] Patent Number: 4,555,977
[45] Date of Patent: Dec. 3, 1985

[54] HYDRAULIC CONTROL CIRCUIT FOR CONTROLLING AND MONITORING OPERATING PRESSURE IN A HYDRAULIC CONSUMER DEVICE

[75] Inventor: Helmut Motzer, Leinfelden-Echterdingen, Fed. Rep. of Germany

[73] Assignee: Herion-Werke KG, Fellbach, Fed. Rep. of Germany

[21] Appl. No.: 527,303

[22] Filed: Aug. 29, 1983

[30] Foreign Application Priority Data

Sep. 1, 1982 [DE] Fed. Rep. of Germany ....... 3232536

[51] Int. Cl.⁴ ............................................. F15B 11/08
[52] U.S. Cl. ...................................... 91/446; 137/491
[58] Field of Search ................. 91/433, 446, 447, 468; 137/491, 489, 529, 116.3, 554, 494

[56] References Cited

U.S. PATENT DOCUMENTS

| | | | |
|---|---|---|---|
| 1,361,636 | 12/1920 | Stage | 137/116.3 |
| 2,326,462 | 8/1943 | Johnson | 137/494 |
| 2,851,564 | 9/1968 | Zimmerman | 137/491 X |
| 2,923,306 | 2/1960 | Mitchell | 137/491 X |
| 3,613,717 | 10/1971 | Smith | 137/491 |
| 3,945,399 | 3/1976 | Tirelli | 137/529 |

FOREIGN PATENT DOCUMENTS

| | | | |
|---|---|---|---|
| 1909338 | 9/1970 | Fed. Rep. of Germany | 137/491 |
| 1223383 | 2/1971 | United Kingdom | 137/554 |

*Primary Examiner*—Edward K. Look
*Attorney, Agent, or Firm*—Michael J. Striker

[57] ABSTRACT

A valve device for controlling and monitoring an operating pressure in a hydraulically operated consumer arrangement, such as a tool chuck or head stock of a machine tool, includes a pressure reducing valve coupled to the consumer device and a servo valve connected to the pressure reducing valve for adjusting the operating pressure to a maximal allowable value. The servo valve is in turn connected to a flow monitoring device which upon reduction of operating pressure in the consumer device generates an electrical signal which is used for shutting off the consumer device.

9 Claims, 4 Drawing Figures

HYDRAULIC CONTROL CIRCUIT FOR CONTROLLING AND MONITORING OPERATING PRESSURE IN A HYDRAULIC CONSUMER DEVICE

BACKGROUND OF THE INVENTION

The present invention relates to a valve device for controlling and monitoring an operating pressure in hydraulically-operated consumer devices, for example a chuck or a head stock of a tool machine.

Valve arrangements for controlling an operating pressure and adjusting said pressure to a predetermined value are known in the art.

Conventional valve arrangements, however, do not provide a satisfactory adjustment of the operating pressure in the consumer device in accordance with a requirement of the pressure medium consumption.

SUMMARY OF THE INVENTION

It is an object of the present invention to provide a improved valve device for controlling an operating pressure in a pressure medium operated consumer arrangement.

It is another object of the invention to provide a valve device which is designed so that the operating pressure of the hydraulically operated consumer device is adjusted according to demand, and if the operating pressure of the pressure medium in the consumer device is declined below a predetermined value the consumer device can be shut off.

These and other objects of the invention are attained by a valve device for controlling and monitoring of an operating pressure of a pressure fluid in a hydraulically-operated consumer device, particularly for a chuck or head stock of a machine tool, comprising a pressure-reducing valve including an inlet connection to receive a pressure fluid from a pressure fluid source, a control connection connected to the consumer device and a servo control connection; a servo valve connected to said servo control connection of the pressure-reducing valve and operative for adjusting an operating pressure in the consumer device to a defined value; and a pressure fluid flow monitoring device connected to said servo valve and operative for shutting off the consumer device if the operating pressure in the consumer falls below an adjusted value of the operating pressure.

The flow-monitoring device may include a contactless like operated electrical switch, a displaceable valve piston having two opposite sides, and a spring, said valve piston being loaded at one side thereof with the pressure fluid flowing into the flow monitoring device directly from said servo valve and at the other side thereof being permanently loaded with said spring, said displaceable valve piston being operative for switching on said switch to shut off said consumer device.

The flow monitoring device may include an inlet passage connected to said servo valve and an outlet passage connected to a tank, said inlet passage being formed with a throttle means through which a permanent connection between said inlet passage and said outlet passage is established.

The valve piston of the flow monitoring device may be formed with a number of grooves extended axially of the valve piston, said flow monitoring device having a housing formed with a control edge, said grooves cooperating with said control edge upon displacement of said valve piston in said housing.

The servo valve may be formed as a cone valve and include a housing, a valve shaft terminated with a valve cone, a valve seat sleeve positioned in said housing and cooperating with said valve cone under the pressure of the pressure fluid received from said pressure-reducing valve, an adjustable compression spring in said housing, and a proportional magnet, said valve cone being displaceable between an open and closing position in respect to said valve seat sleeve and being loaded in an opening direction by said proportional magnet and being constantly loaded in a closing direction by said adjustable compression spring.

The servo valve may be formed as a cone valve and include a housing, a valve shaft terminated with a valve cone, a valve seat sleeve in said housing and cooperating with said valve cone under pressure of the pressure fluid received from said pressure-reducing valve, a proportional magnet having an armature connected to said valve shaft, a pair of springs, said valve seat sleeve being together with said valve cone displaceable in an axial direction for adjusting a maximal pressure of the pressure fluid by said proportional magnet against the force of said springs, one of said springs loading said valve cone and another of said springs loading said valve seat sleeve in the direction of closing of said valve cone.

The servo valve may further include a clamping collet concentrically surrounding said valve seat sleeve, so that said valve seat sleeve is pressed radially against said clamping collet and is thereby held in its axial position.

The servo valve may further include a clamping sleeve concentrically surrounding said clamping collet and displaceable in the axial direction, said clamping sleeve having an inner conical surface and said clamping collet having an outer conical surface matching said inner conical surface whereby said clamping sleeve acts upon said clamping collect in the radial direction.

The servo valve may include a third compression spring disposed in said housing and operative to hold said clamping sleeve in engagement with said clamping collet, the pressure medium received in the servo valve acting against the force of said third spring causing an axial displace ment of said clamping sleeve relative to said clamping collet thus disengaging the latter from the former.

The valve device may further include a control valve mounted in the housing of said servo valve and operatively connected thereto and including a control piston, a switching magnet connected to said control piston to actuate the latter to allow the pressure medium to flow into said servo valve so as to cause said axial displacement of said clamping sleeve to disengage the clamping sleeve from the clamping collet.

DETAILED DESCRIPTION OF THE PREFERRED EMBODIMENTS

Figure 1:
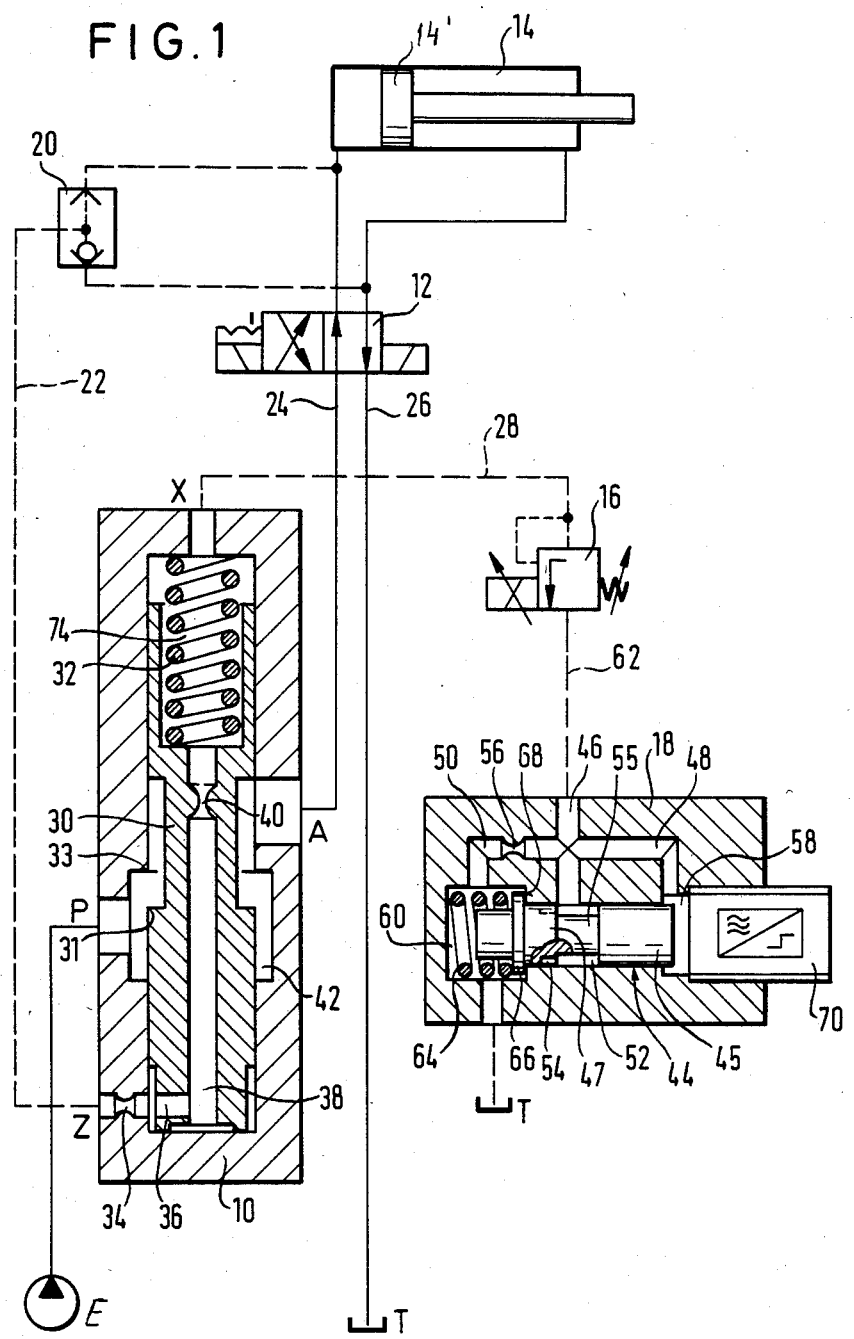
FIG. 1 is a schematic view of a control valve device according to one embodiment of the invention.

With reference to FIG. 1 it is shown that the valve device according to the invention is comprised of a pressure-reducing valve 10, a directional control valve 12 and a servo valve 16, a pressure medium flow-monitoring device 18 and a three-way valve 20. Reference character 14 denotes a consumer device.

The pressure-reducing valve 10 has an inlet connection P which is connected to a pressure medium source E, for example hydraulic pump. A consumer connection A of the pressure-reducing valve is, via a conduit 24, connected to one side of consumer device 14 the other side of which is in communication, via a conduit 26, with a pressure medium tank T, to which the pressure medium, for example pressure oil, is fed back.

Consumer device 14 can be, for example a chuck of the machine tool, e.g. lathe or the like. The cylinder of the consumer device 14 is loaded with pressure oil at each side. The directional control valve 12 serves to switch the flow of pressure oil over to either side of the cylinder. The three-way valve 20 is connected to conduit 24 and conduit 26 in the region between directional control valve 12 and consumer device 14. Three-way valve 20 is further connected through a conduit 22 to a control connection Z of the pressure-reducing valve 10. The latter is provided with an operating piston 30 which, through a compression spring 32, is held in its end position illustrated in FIG. 1.

The control connection Z which has a throttle 34, opens, via a transversal bore 36, into a longitudinal bore 38 formed in the operating piston 30 in the axial direction thereof. A throttle 40 is formed in the longitudinal bore 38. This bore merges into a spring chamber 74 also formed in the operating piston 30, which chamber accommodates compression spring 32 which bears at its one end against the internal wall of the housing of valve 10. Chamber 74 is in communication with a servo control connection X of the pressure-reducing valve 10. Connection X is, via a conduit 28 connected to the servo control valve which will be discribed in detail below. Valve 16 is, in turn, in connection with an inlet passage 46 of the flow monitoring device 18 by means of a conduit 62.

In the flow monitoring device 18, inlet passage 46 is branched off into two passages 48 and 50. The flow monitoring device 18 includes an axially movable operating piston 44 which has two portions 45 and 47 of the same diameter and an intermediate portion 55 of a reduced diameter connecting piston portions 45 and 47 to each other. Operating piston 44 is adapted to move within the housing of flow monitoring device 18. Due to the reduced diameter of piston portion 55 an annular space or chamber 52 is formed in the housing of the flow-monitoring device. The piston portion 47 has a collar 66 of an enlarged diameter which is permanently loaded with a compression spring 64 and which is thereby pressed against a shoulder or control edge 68 formed in the housing of the monitoring device. Passage 50 branched off from the inlet passage 46 is formed with a throttle 56 and leads to a spring chamber 60 which accommodates spring 64 and the end portion of piston 44. Spring chamber 60 is in communication with the pressure-medium containing tank T. Passage 48 also branched off from the inlet passage 46 and extended in the opposite direction leads to a piston chamber 58, one wall of which is formed by the front face of the piston portion 45. The piston portion 47 is provided with a number of axial notches or grooves 54 distributed on the periphery of the piston portion 47, these notches extending in the axial direction from the end side of the intermediate piston portion 55 over the part of the piston portion 47.

The operation of the valve device shown in FIG. 1 is as follows:

The pressure medium received at inlet connection P from the pump E flows through the annular passage or channel 42 to the consumer connection A and from hence, via conduit 24 and directional control valve 12, to the consumer device 14. In the position of the hydraulic consumer device 14 shown in the drawing, device 14 is loaded at the front face of its piston 14', the pressure oil can, however, by switching over of the directional control valve 12, be fed onto the rear side of the piston. As soon as pressure of the oil in the consumer device 14 reaches its value adjusted in the servo valve 16, the oil flows from the consumer device 14, through the conduit 24, to the three-way valve 20 and from hence into conduit 22 and then to the control connection Z of the pressure-reducing valve 10 and then, through throttle 34 and transversal bore 36, into the elongated bore 38, from which oil passing through throttle 40 flows into spring chamber 74, and then to the servo control connection X. In consequence, throttle 40 in the elongated bore 38 produces pressure drop in the flowing oil whereby a higher pressure at the lower face of the operating piston (in the plane of the drawing) acts against the force of spring 32 and due to the lower pressure in the region of bore 38 after throttle 40, the operating piston 30 is displaced upwardly. This displacement of piston 30 continues unless it reaches its normal position, or unless shoulder 31 of the operating piston 30 abuts against the control edge 33 formed in the housing of the pressure-reducing valve 10. The operating process of the pressure-reducing valve is known itself and thus is not described in further detail.

The operating pressure of the pressure oil is adjusted in the servo valve 16. As has been mentioned above the pressure oil flows from the servo control connection X, via conduit 28, to the servo valve 16 in which its pressure is adjusted to any desired operating value. Unless the pressure of the oil entering servo valve 16 does not reach a desired value the servo control valve is closed. If the pressure of the oil exceeds the operating value the servo control valve opens and the oil passing this valve flows further through conduit 62 into inlet passage 46 of the flow monitoring device 18.

In the flow monitoring device 18, pressure oil flows from inlet passage 46 into annular chamber 52, on the one hand, and on the other hand, through passage 48 into piston chamber 58 and finally, via throttle 56, passage 50 and spring chamber 60 to the outlet of the flow-monitoring device 18 and then to the tank T. Throttle 56 originates an impact pressure in passage 48 and in piston chamber 58, whereby piston 44 is displaced against the force of compression spring 64 to the left (in the plane of the drawing). This movement continues unless notches 54 in the piston portion 47 travel over the control edge 68 formed in the housing of the monitoring device and oil is able to flow from inlet passage 46, via grooves or notches 54, into the spring chamber 60 and then into tank T.

If pressure in the consumer device 14 now drops below the operating pressure adjusted in the servo control valve 16 the latter will close and no oil will be permitted to flow through conduit 62 into flow monitoring device 18. Piston 44 will now be pressed by the compression spring to the right (in the plane of the drawing) and will move unless its shoulder 66 will rest against the control edge 68. The displaced oil will flow through throttle 56 to the outlet of the monitoring device and then to the tank T. Piston portion 45 is during this movement displaced towards the electrical switch 70 to load the latter. The contactless switch 70 is thereby switched on to produce a signal which indicates a reduction of the operating pressure or the clamping pressure in the consumer device, e.g. a tool chuck. This signal can be used, for example for braking the machine spindle of the corresponding machine tool or for shutting the machine tool off.

The advantage of the monitoring device over known pressure switches is, for example in that it should not be newly adjusted when the servo control valve is adjusted to another maximal pressure.

A repeating switching of the consumer can be obtained automatically when the operating pressure again reaches its adjusted value, it can be also provided that the construction can be switched over manually, after a possible error has been detected.

Figure 2:
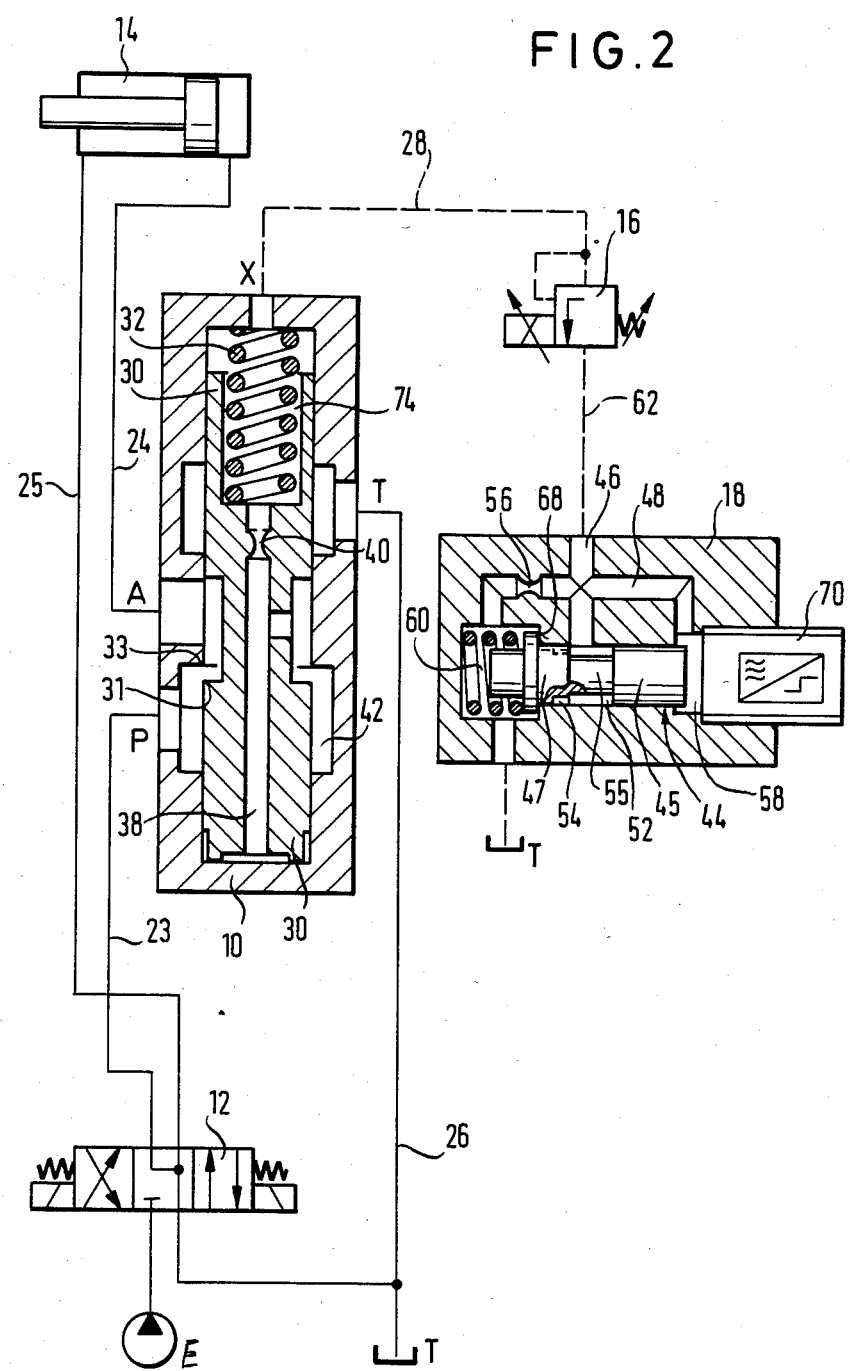
FIG. 2 is a schematic view of the control device in accordance with a further embodiment of the invention.

The embodiment of FIG. 2 practically operates in the same fashion as that of FIG. 1. The servo valve 16 and the flow monitoring device 18 are identical to those of FIG. 1 whereas the pressure-reducing valve 10 is of a modified construction. The valve arrangement of FIG. 2 can serve as a clamping device of a head stock. Since in this case only one side of the cylinder must be controlled the control oil extraction can be obtained directly in the pressure-reducing valve 10 (the loading of another side of the cylinder of the consumer device 14 serves only for guiding the head stock in the reserve direction which should not be controlled.

The directional control valve 12 is in FIG. 2 shown in its zero position. In the operating position the pressure oil flows to the inlet connection P, then via the annular passage 42 to connection A, through a conduit 24 to the consumer device 14. Simultaneously the pressure oil flows from annular passage 42 via a transverse passage into elongated passage 38 of the operating piston 30 and from hence upwardly through throttle 40 to the control connection X in the manner discussed for FIG. 1. Then the pressure oil flows through conduit 28 to the servo valve 16 in which it is preliminarily adjusted to a desired operating pressure.

Servo valve 16 and flow monitoring device 18 operate in the same fashion as has been described in connection with FIG. 1. Pressure-reducing valve 10 operates practically also in the same manner as that shown in FIG. 1. The pressure oil flowing into passage 38 according to the embodiment of FIG. 2 loads the lower face of the operating piston 30 whereby the piston moves upwardly against the force of spring 32 unless it reaches its operating position. The connection between P and A becomes closed and the connection between H and T opens so that the pressure oil can flow from the consumer device 14 via conduit 24, then connections A and T towards the tank T. If the directional control valve 12 is now switched over to another position the pressure oil will flow through conduit 25 to the back side of the cylinder of the consumer device 14 causing the reverse movement of the head stock. Connection P at the same time becomes connected through directional control valve 12 with the tank T.

Figure 3:
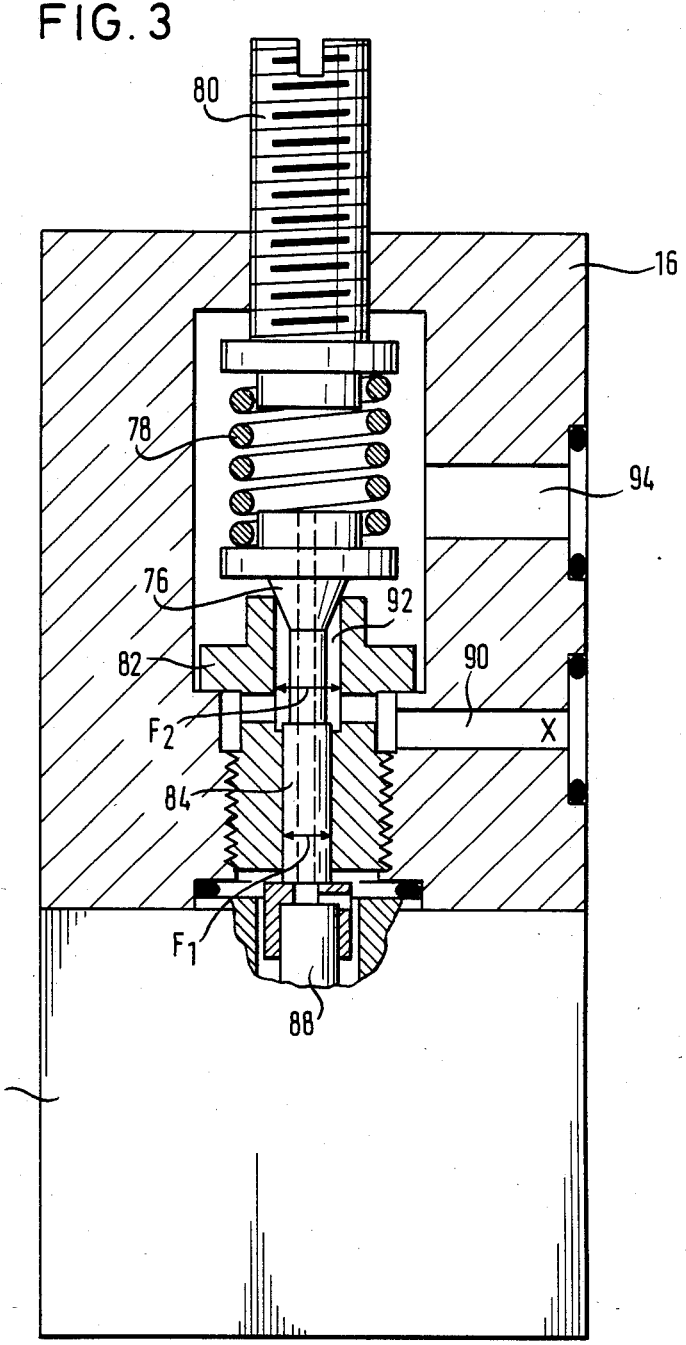
FIG. 3 is a schematic view of the first embodiment of a servo valve.

FIG. 3 illustrates a sectional view through the servo valve 16 according to the prefered embodiment thereof. The valve employs a valve cone 76 formed at the end of a valve shaft 84. Valve cone 76 cooperates with a valve seat sleeve or ring 82, the latter being screwed into the housing of servo valve 16. The cone valve has as mentioned above the shaft 84 the end of which opposite to the end carrying the valve cone 76 is connected to an armature 88 of a proportional magnet 86. The cone valve in its closed position is biased with a spring 78 which can be more or less loaded by means of a spindle 80. In this case a desired operating pressure is adjusted manually.

If the pressure oil flows from the control connection X of the pressure-reducing valve 10 of FIG. 1 or FIG. 2 via conduit 28, into an inlet bore 90 of the servo valve 16 it flows then through an annular space 92 between the valve shaft 84 and valve seat ring 82. Both sides of valve cone 76 are connected to each other via the hole in the valve shaft 84. The pressure of the control oil now acts upon the differential surface F2-F1 of valve cone 76 against the force of spring 78 and against the pressure acting behind the valve cone 76 on the differential surface F2-F1. If the operating pressure reaches its adjusted (desired) value the valve cone 76 then will be lifted from the valve seat ring 82 and the pressure oil will flow through an outlet bore 94 to the flow monitoring device 18 shown in FIGS. 1 and 2.

Due to energizing of proportional magnet 86 the adjusted maximal pressure can be reduced by means of spring 78 because a force is exerted on the valve cone 76 by the proportional magnet in the opening direction. Valve cone 76 opens when the pressure has been already reduced.

When the flow drops and the proportional magnet is out of action only compression spring 78 acts on the valve cone 76 in the closing direction, that is the pressure of the control oil is risen by means of spindle 80 to an allowable adjusted maximal value, which results in that the pressure in the consumer device is not affected during the flow drop.

Figure 4:
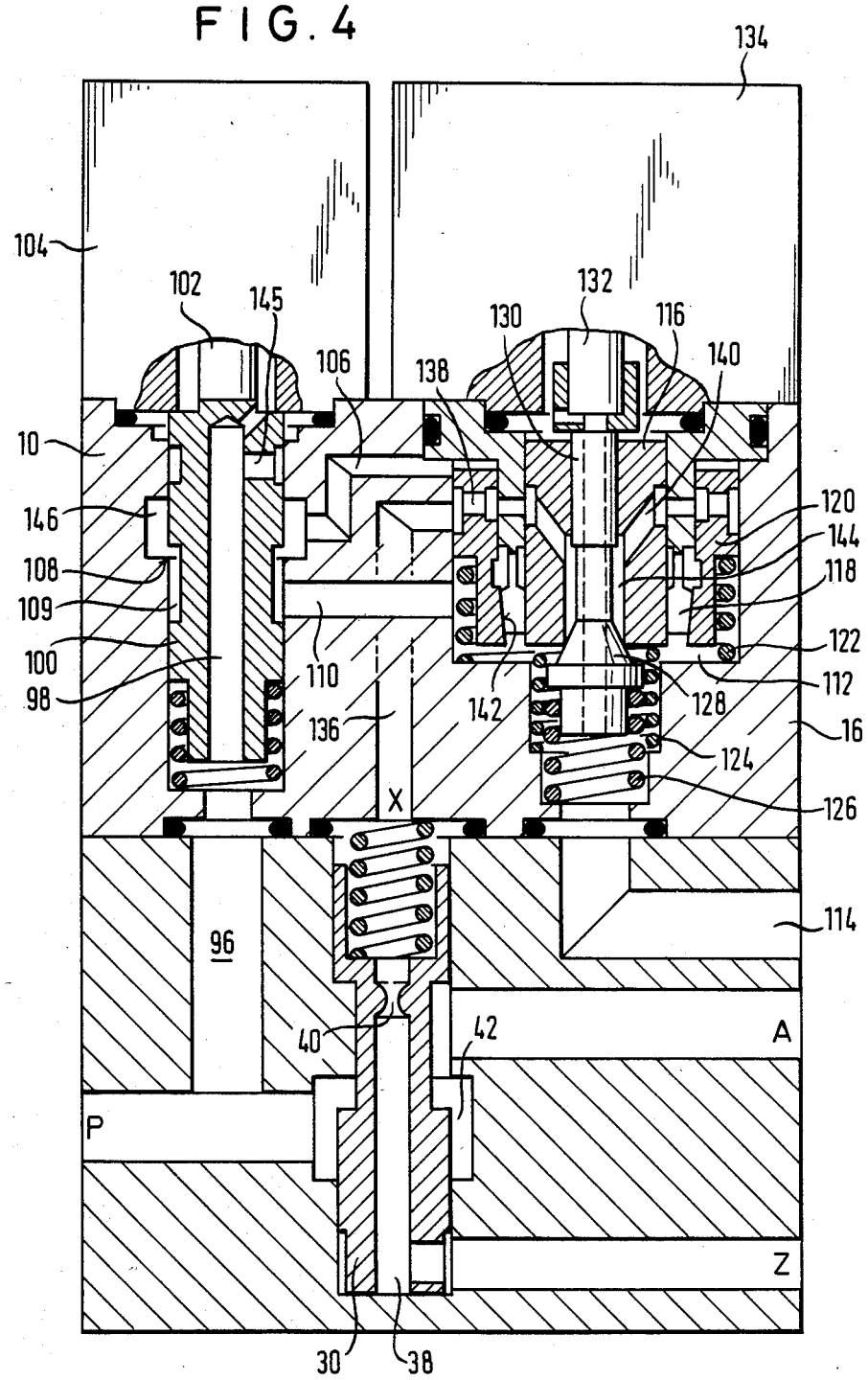
FIG. 4 is a schematic view of another embodiment of the servo valve in conjunction with a pressure-reducing valve.

FIG. 4 shows a further embodiment of servo valve 16. The latter in this embodiment is coupled with the pressure-reducing valve 10, in other words they can be mounted in a housing as a unit. The servo valve is provided with a switching magnet 104 having an armature 102, which is connected to a control piston 100 which forms a control valve.

In the position of the valve shown in the drawing, pressure oil flows from the connection P via annular passage 42 to the consumer connection A and from there, as shown in FIG. 1, back to the control connection Z. Then the pressure oil flows in the manner described for FIG. 1, via the elongated bore 38 of the operating piston 30, through throttle 40 to the servo valve connection X.

The inlet connection P is in communication with an elongated bore 98 of control piston 100 through a channel 96. The switching magnet 104 is deenergized in the operative position of the valve, the control piston 100 is being pressed against the armature 102 of the switching magnet 104 by means of the spring not shown in detail. The control passage 106 formed in the housing of the valve is connected, by a passage in the region of control edge 108 and an annular passage 109, with a transversally extended bore 110 which leads to a spring space or chamber 112 which is, in turn, connected at one side thereof with a connection channel 114, the latter leading to the flow monitoring device 18 not shown in FIG. 4. Control passage 106, bore 110 and annular chamber 112 are in the illustrated position of the valve in communication with each other.

Servo valve 16 includes a cone valve which has a valve cone 128 integrally formed with a valve shaft 130, the latter being connected at its end to an armature of a proportional magnet 134. Valve cone 128 cooperates with a valve seat sleeve 116 which concentrically surrounds the valve shaft 130. The valve seat sleeve 116 is disposed in a collet or clamping sleeve 118 which concentrically surrounds sleeve 116. Collet 118 is radially pressed against the outer periphery of valve seat sleeve 116 by means of a clamping sleeve 120.

The clamping jaws of the clamping sleeve 118 have an outer conical surface whereas the clamping sleeve 112 has an inner conical surface so that due to an axial displacement of the clamping sleeve 120 the clamping jaws of clamping sleeve 118 are radially forced against the outer preiphery of the valve seat sleeve 116. The clamping sleeve 120 is axially loaded in the clamping direction by means of a compression spring 122. The valve seat sleeve 116 is axially pressed by means of compression spring 124 against the proportional magnet 134. The valve cone 128 is constantly loaded in the closing direction by compression spring 126 and pressed against the valve seat sleeve.

The control oil discharged from the servo control connection X flows through bore 136 into transverseal bore 138, inclined bores 140 and then into the annular passage 144 between the valve seat sleeve 116 and valve shaft 130, the pressure oil loading the valve cone 128 in the opening direction. If the pressure of the oil on the valve cone 128 reaches its adjusted maximal value or exceeds that maximal alue the valve cone 128 will be lifted from the valve seat sleeve 116 and servo valve 16 opens. The pressure oil then can flow through a spring chamber 112 to the connection channel 114 and then to the flow monitoring device 18 (FIG. 1). The adjustment of maximal pressure in this embodiment is not manual but is carried out by displacement of the valve seat sleeve 116 against springs 124 and 126.

If switching magnet 104 is actuated the control piston 100 is displaced against its spring downwards and the control edge 108 closes. At the same time the connection from the elongated bore 98 to control passage 106 via transversal bore 145 and annular passage 146 opens. The full feeding pressure thus occurs in the control passage 106 which loads the clamping sleeve 120 and causes movement thereof against the spring 122 in the downward direction whereby this sleeve becomes released from the collet 118. Collet 118 which is rigidly held in the housing of the valve releases the valve seat sleeve 116.

By means of proportional magnet 134 can the valve seat sleeve 116 move in the axial direction against the force of springs 124, 126. Thereby valve cone 128 can be displaced in the closed position and a new closed position thereof will be adjusted so that the valve can be adjusted to another desired maximal pressure.

The switching magnet 104 is now shut off and the control piston 100 takes the position shown in FIG. 4, in which position control passage 106 is in communication with the spring chamber 112. Both sides of the clamping sleeve 120 are in this position under the same pressure. The clamping sleeve 120 is displaced in the axial direction by spring 122 and its inner conical surface is pressed against the outer conical surface 142 of collet 118 whereby the latter is pressed radially against the valve seat sleeve 116 and this sleeve is locked in a new adjusted position.

The adjustment of the maximal pressure in the embodiment of FIG. 4 is attained by means of proportional magnet 134 whereas in the embodiment of FIG. 3 this adjustment is carried out by means of the manually operated spindle 80. If the maximal valve is adjusted and the valve seat sleeve 116 is clamped the operating pressure can be adjusted in the same fashion as has been described in connection with the embodiment of FIG. 3.

It will be understood that each of the elements described above, or two or more together, may also find a useful application in other types of valve arrangements differing from the types described above.

While the invention has been illustrated and described as embodied in a valve device for controlling operating pressure, it is not intended to be limited to the details shown, since various modifications and structural changes may be made without departing in any way from the spirit of the present invention.

Without further analysis, the foregoing will so full reveal the gist of the present invention that others can, by applying current knowledge, readily adapt it for various applications without omitting features that, from the standpoint of prior art, fairly constitute essential characteristics of the generic or specific aspects of this invention.

I claim:

1. An hydraulic control circuit for controlling and monitoring of an operating pressure of a pressure fluid in a hydraulically-operated consumer device, particularly for a tool chuck or head stock of a machine tool, comprising a pressure-reducing valve including an inlet connection to receive a pressure fluid from a pressure fluid source, a control connection connected to the consumer device, and a servo control connection; a servo valve connected to said servo control connection of the pressure-reducing valve to receive pressure fluid therefrom, said servo valve adjusting an operating pressure of said fluid to a desired value; and a pressure fluid flow monitoring device connected to said servo valve, said flow monitoring device including a contactless electrical switch operative for shutting off the consumer device, a displaceable valve piston having two opposite sides, and a spring, said valve piston being loaded at one side thereof with the pressure fluid flowing into the flow monitoring device directly from said servo valve and at the other side thereof being continually loaded with said spring, said displaceable valve piston being operative for switching on said switch to shut off said consumer device if the operating pressure in the consumer device falls below a value of the operating pressure adjusted in said servo value.

2. The control circuit as defined in claim 1, wherein said flow monitoring device includes an inlet passage connected to said servo valve and an outlet passage connected to a tank, said inlet passage being formed with a throttle means through which a permanent connection between said inlet passage and said outlet passage is established.

3. The control circuit as defined in claim 2, wherein said valve piston of the flow monitoring device is formed with a number of grooves extended axially of the valve piston, said flow monitoring device having a housing formed with a control edge, said grooves cooperating with said control edge upon displacement of said valve piston in said housing.

4. The control circuit as defined in claim 1, wherein the servo valve is formed as a cone valve and includes a housing, a valve shaft terminated with a valve cone, a valve seat sleeve positioned in said housing and cooperating with said valve cone under the pressure of the pressure fluid received from said pressure-reducing valve, an adjustable compression spring in said housing, and a proportional magnet, said valve cone being displaceable between an open and closing position in respect to said valve seat sleeve and being loaded in an opening direction by said proportional magnet and being constantly loaded in a closing direction by said adjustable compression spring.

5. The control circuit as defined in claim 1, wherein said servo valve is formed as a cone valve and includes a housing, a valve shaft terminated with a valve cone, a valve seat sleeve in said housing and cooperating with said valve cone under pressure of the pressure fluid received from said pressure-reducing valve, a proportional magnet having an armature connected to said valve shaft, and a pair of springs, said valve seat sleeve being together with said valve cone displaceable in an axial direction for adjusting a maximal pressure of the pressure fluid by said proportional magnet against the force of said springs, one of said springs loading said valve cone and another of said springs loading said valve seat sleeve in the direction of closing of said valve cone.

6. The control circuit as defined in claim 5, wherein said servo valve further includes a clamping collet concentrically surrounding said valve seat sleeve so that said valve seat sleeve is pressed radially against said clamping collet and is thereby held in its axial position.

7. The control circuit as defined in claim 6, wherein said servo valve further includes a clamping sleeve concentrically surrounding said clamping collet and displaceable in the axial direction, said clamping sleeve having an inner conical surface and said clamping collet having an outer conical surface matching said inner conical surface, whereby said clamping sleeve acts upon said clamping collet in the radial direction.

8. The control circuit as defined in claim 7, wherein said servo valve includes a third compression spring disposed in said housing and operative to hold said clamping sleeve in engagement with said clamping collet, the pressure fluid received in the servo valve acting against the force of said third spring causing an axial displeascement of said clamping sleeve relative to said clamping collet thus disengaging the latter from the former.

9. The control circuit as defined in claim 8, further including a control valve mounted in the housing of said servo valve and operatively connected thereto and including a control piston a switching magnet connected to said control piston to actuate the latter to allow the pressure fluid to flow into said servo valve so as to cause said axial displacement of said clamping sleeve to disengage the clamping sleeve from the clamping collet.

* * * * *